Patented Apr. 7, 1936

2,036,593

UNITED STATES PATENT OFFICE 2,036,593

PREPARATION OF ALKYLATED AROMATIC CARBOCYLIC SULPHONIC ACIDS

Ernst Alfred Mauersberger, Maarssen, near Utrecht, Netherlands

No Drawing. Application January 6, 1934, Serial No. 705,567. In Germany November 29, 1933

5 Claims. (Cl. 260—159)

My invention relates to sulphonic acids with capillary active properties, and to a process of producing the same by condensation.

It has been heretofore proposed to produce alkylated aromatic sulphonic acids, mainly from low molecular aliphatic alcohols, and so far as I am aware all of these methods involved operation at high temperatures and the use of fuming sulphuric acid or sulphonic acid chloride. This resulted in a certain position of the sulphonic group to the alkyl group. Were these methods to be applied to saturated aliphatic alcohols containing twelve or more carbon atoms and primarily to unsaturated alcohols containing more than 16 carbon atoms, such as are recoverable from sperm oil, only colloidally solubie products of a decidedly dark color would be obtained, which would not only additionally darken in the light but would also discolor textiles. These products would, therefore, be unusable. This is due to the high temperatures which must be used to cause absolute condensation, as otherwise the products would smell of naphthalene or other aromatic hydrocarbon. An additional reason for the necessity of using these high temperatures in the case of saturated aliphatic alcohols containing twelve or more carbon atoms is that these alcohols are solid bodies which cannot be condensed in this condition.

Moreover, the unsaturated alcohols are so susceptible when subjected to fairly long action by anhydrous sulphuric acid, fuming sulphuric acid or chlorsulphonic acid, even at medium temperatures over 50° C., that strong oxidation and polymerization phenomena always occur which render the final products unusable. Were the temperature to be still further reduced, satisfactory condensation would only be obtained after a number of days and then oxidation and polymerization would have taken place so that dark, unusable products would result.

I have now found that I can effect the condensation as well as the sulphonation of aliphatic alcohols of all kinds containing at least 12 carbon atoms with aromatic hydrocarbons at temperatures as low as 25° C. and higher and with commercial concentrated sulphuric acid, if prior to condensation the aliphatic alcohols are esterified with boric acid to form borates. This procedure results not only in a saving of sulphonating media but also in the production of practically pure white condensates which dissolve absolutely clearly and colorlessly.

It has been heretofore suggested that boric acid ester of butyl alcohol may be used to introduce the butyl group into aniline and for the production of ethers and other compounds, but this procedure comprises the direct reaction of butyl borate with other compounds without the use of any auxiliary media. Neither butyl borate nor the borates of other aliphatic alcohols will react with aromatic hydrocarbons.

I may use all aliphatic alcohols containing at least 12 carbon atoms, as for example primary and secondary, saturated and unsaturated, univalent and divalent alcohols which, prior to condensation, are first converted into boric acid esters. The conversion may be into orthoboric acid esters, metaboric acid esters and stages intermediate the two.

The aromatic hydrocarbons which I may employ are benzol, naphthalene and anthracene, their derivatives and hydration products containing only hydrogen and carbon atoms. For economic reasons the use of naphthalene is preferable.

Condensation and sulphonation may be effected in one operation, although the hydrocarbons may first be sulphonated and the boric acid esters thereupon condensed or vice versa. The position of the sulphonic group to the alkyl group is naturally dependent upon the temperature at which condensation and sulphonation are effected, as well as upon whether sulphonation or condensation is first effected.

Condensation as well as sulphonation can be effected at temperatures between 25° C. and 45° C. As a general thing, commercial concentrated sulphuric acid will serve as the sulphonating and condensing medium, although I may of course also use fuming sulphuric acid or sulphonic acid chloride. The operating conditions are suited to the purpose for which the final product is to be used.

The resulting sulphonic acids are clearly soluble in cold water and have strongly capillary active properties. If it be desired to further increase the wetting and washing capacity of the products, the introduction of the chlorine group into the alcohol radical (not into the aromatic hydrocarbon) is necessary. The chlorination may be effected with the alcohol, or better still, with the boric acid ester which forms.

The resulting sulphonic acids are desirably neutralized with alkaline reacting substances. The final products are usable as capillary active substances, particularly as washing media, in the textile, leather and paper industry, as well as for cosmetics and household use.

The following examples will serve to illustrate the manner in which the invention may be practiced:

*Example 1*

180 parts of orthoboric acid ester of oleyl alcohol and 120 parts of naphthalene are heated to about 80° C., the naphthalene dissolving in the course of heating. The solution is then cooled to about 30° C. with vigorous stirring, resulting in the formation of a thick paste. This paste is cooled and stirred and during the cooling and stirring 300 parts of concentrated sulphuric acid are added thereto at a speed such that the temperature reaches about 40° C. at which temperature stirring is effected for approximately three hours. Thereupon the mass is permitted to stand at this temperature for about one hour, causing settling of the sulphuric acid which contains the boric acid, and the sulphuric acid is drawn off. To the mass there is then again added about 100 parts of concentrated sulphuric acid, with vigorous stirring, and the sulphonation within an hour produces clear and colorless water solubility. The resulting product is introduced into 200 parts of water, cooling being effected during the introduction, thus obtaining a thin light brown oil which is neutralized with finely crystallized soda, stirring being effected during neutralization. This product is practically pure white in color, dissolves clearly and colorlessly in water and after standing a few days may be pulverized in a warm and dry place.

*Example 2*

170 parts of orthoboric ester of cetyl alcohol are treated at slightly elevated temperature with chlorine until the weight is increased to 200 parts. Thereupon 130 parts of naphthalene are added, and solubility is effected, with stirring. The solution is heated to 120° C., causing the escape of any hydrochloric acid still held in solution, whereupon cooling to 25° C. is effected, with stirring, and then condensation and sulphonation are effected as in Example 1. The resulting product is neutralized as indicated or in any other appropriate manner.

*Example 3*

Produce beta sulphonic acid of naphthalene by treating 120 parts of naphthalene with 160 parts of a 15% fuming sulphuric acid at a temperature of about 150° C. until absolute water solubility is attained. Thereupon cool to about 50° C. and add 180 parts of orthoborate of sperm oil alcohol, not permitting the temperature to rise beyond 50° C. Then introduce, with stirring, 70 parts of 66° Bé. sulphuric acid and effect condensation within three hours as in Example 1. The product is further treated as explained in Example 1.

*Example 4*

Dissolve 200 parts of orthoborate of lauryl alcohol in 100 parts of benzol and stir cold to 30° C. Introduce 300 parts of 10% fuming sulphuric acid and condense during five hours, with good stirring, at about 45° C. Thereupon draw off the sulphuric acid containing the boric acid as explained in Example 1 and complete the sulphonation with concentrated sulphuric acid or fuming sulphuric acid. Further treatment of the sulphonic acid is as described above.

I claim:

1. The herein described process of producing neutral sulphuric acid condensation products, which process comprises the steps of esterifying with boric acid an aliphatic alcohol containing at least 12 carbon atoms in the molecule and reacting the resulting boric acid esters to the point of condensation and sulphonation with an aromatic hydrocarbon containing only carbon and hydrogen atoms at temperatures between 25 and 45° C. in the presence of a substance selected from the class consisting of commercial concentrated sulphuric acid and fuming sulphuric acid.

2. The herein described process of producing neutral sulphuric acid condensation products, which process comprises the steps of esterifying with boric acid an unsaturated aliphatic alcohol containing at least 16 carbon atoms and reacting the resulting boric acid ester to the point of condensation and sulphonation with an aromatic hydrocarbon containing only carbon and hydrogen atoms at temperatures between 25 and 45° C. in the presence of commercial concentrated sulphuric acid.

3. The herein described process of producing neutral sulphuric acid condensation products, which process comprises condensing a boric acid ester of an aliphatic alcohol containing at least 12 carbon atoms and an atom of chlorine in the molecule, with an aromatic hydrocarbon containing only carbon and hydrogen at temperatures between 25 and 45° C. in the presence of commercial concentrated sulphuric acid.

4. The herein described process of producing neutral sulphuric acid condensation products, which process comprises the steps of esterifying with boric acid an aliphatic alcohol containing at least 12 carbon atoms and reacting the resulting ester on sulphonic acid aromatic hydrocarbons at temperatures below 45° C. in the presence of commercial concentrated sulphuric acid.

5. As a new composition of matter having capillary active properties, a neutralized alkylated aromatic sulphuric acid whose alkylated group has a chlorine atom in the chain and being the product of condensing with concentrated sulphuric acid at temperatures below 50° C. a boric acid ester of an aliphatic alcohol containing at least twelve carbon atoms in the molecule with an aromatic hydrocarbon containing only carbon and hydrogen atoms.

ERNST ALFRED MAUERSBERGER.